United States Patent [19]
Gray et al.

[11] 3,721,403
[45] March 20, 1973

[54] ROTOGYRO

[76] Inventors: R. Flanagan Gray, RD No. 1, Washington Crossing, John Caswell, 125 South Chancellor Street, Newtown, 18940; William G. Muller, 131 N. Delaware Avenue, Yardley, all of Pa.

[22] Filed: Oct. 8, 1970

[21] Appl. No.: 79,247

[52] U.S. Cl. .................................................244/7 A
[51] Int. Cl. ..............................................B64c 27/22
[58] Field of Search........244/7 R, 7 A, 7 B, 8, 17.11, 244/17.23, 17.25

[56] References Cited

UNITED STATES PATENTS

| | | | |
|---|---|---|---|
| 1,866,869 | 7/1932 | Thurston | 244/17.11 |
| 2,136,165 | 11/1938 | Daland | 244/17.25 |
| 3,174,708 | 3/1965 | Miles | 244/17.25 |
| 1,981,441 | 11/1934 | White | 244/7 R |
| 3,246,861 | 4/1966 | Curci | 244/7 A |
| 2,198,941 | 4/1940 | Jacobs | 244/8 |
| 2,578,578 | 12/1951 | Myers | 244/7 B X |

*Primary Examiner*—Milton Buchler
*Assistant Examiner*—Carl A. Rutledge
*Attorney*—Sperry and Zoda

[57] ABSTRACT

An improved type of aircraft is provided with a rotatable wing having autogyro blades mounted near the ends thereof while having a stationary wing and propeller for horizontal flight. The rotatable wing also serves as an airfoil during horizontal flight but is operable with its autogyro blades during take off and landing to provide greatly increased lift for a given horsepower. The power plant used for driving the rotatable wing and propeller is variably coupled thereto in a manner to attain the most efficient utilization of power under all conditions of flight.

11 Claims, 5 Drawing Figures

PATENTED MAR 20 1973 3,721,403
SHEET 1 OF 2
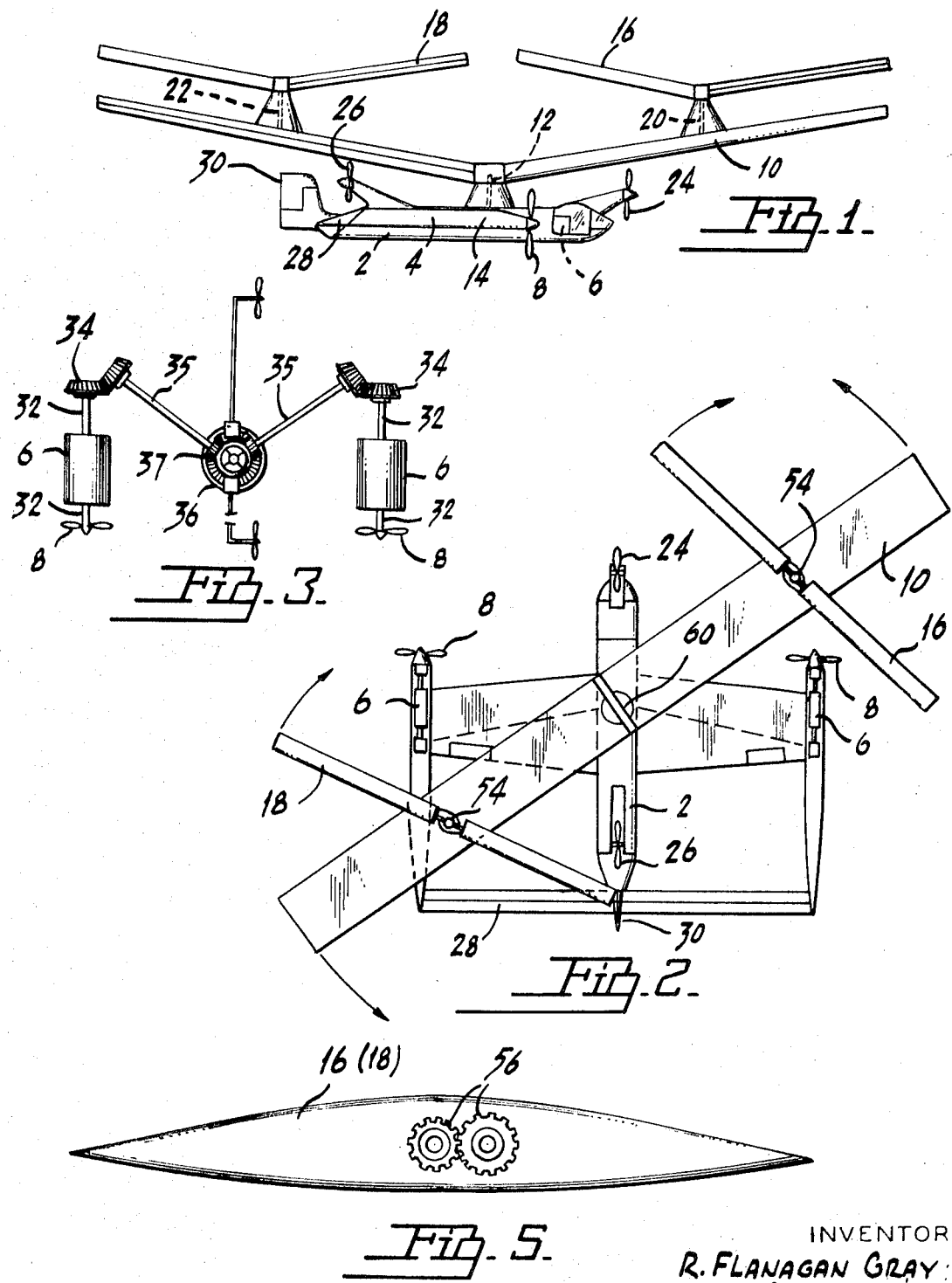
INVENTORS
R. FLANAGAN GRAY
JOHN CASWELL &
WILLIAM G. MULLER
BY Sperry and Zodd
ATTORNEYS

ROTOGYRO

FIELD OF THE INVENTION

Rotation of the blades of an autogyro results from the action of the wind or air flowing over the blades and the amount of lift attained is proportional to the square of the relative wind velocity. Autogyros therefore are highly efficient in generating lifting forces but provide adequate lift at only limited forward speeds. Only dangerous "jump" takeoffs can provide vertical takeoff capability to autogyros. Helicopters can take off vertically under good control but at the time of takeoff require far more horsepower than necessary to sustain forward flight. Conventional aircraft having a fixed airfoil and propeller means such as a motor driven propeller can attain relatively high speeds in horizontal flight but have limited lift capabilities at low speeds and, therefore, require relatively long runways for takeoff and landing.

In accordance with the present invention, the low speed efficiency of the autogyro is combined with the controlled takeoff capability as in helicopters, while permitting high-speed, fixed wing horizontal flight of the aircraft.

For this purpose the aircraft is provided with a stationary airfoil and power plant with propeller means and further is provided with a rotatable wing having autogyro blades carried thereby and located near the opposite ends of the wing. The wing can then be rotated by the power plant to actuate the autogyro blades and attain the desired lift during take off and landing or for changing altitude during flight. However, the rotatable wing also may be held in a fixed position generally parallel to the fixed wing for horizontal flight so as to function as a conventional airfoil during horizontal travel of the aircraft.

The power plant employed is variably connected to the rotatable wing and propeller employed so as to afford a controlled transfer of power to the wing and propeller as required for any conditions encountered during take off, landing, transition to horizontal flight (forward, backwards or sideways) or during conventional horizontal flight.

THE DRAWINGS

FIG. 1 is a diagrammatic side elevation of a typical form of aircraft embodying the present invention;

FIG. 2 is a top plan view of the aircraft illustrated in FIG. 1;

FIG. 3 is a diagrammatic plan view of a preferred power plant assembly for the aircraft;

FIG. 5 is a vertical sectional view through a typical form of rotatable wing that may be employed in aircraft embodying the present invention.

PREFERRED EMBODIMENT OF THE INVENTION

Figure 4:
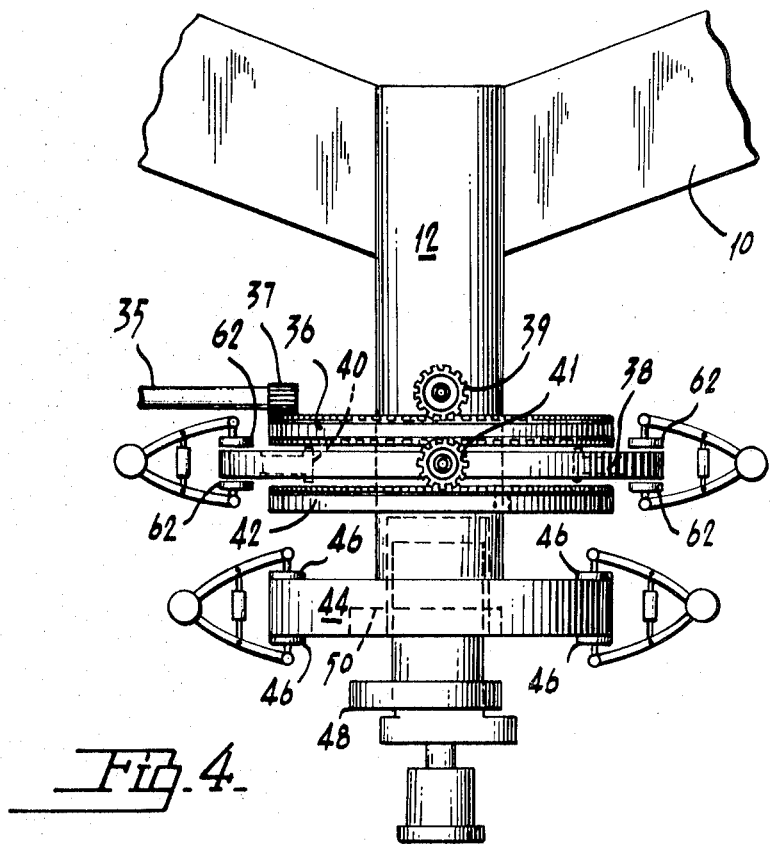
FIG. 4 is a diagrammatic illustration of a portion of the assembly of FIG. 3 showing typical means which may be employed for varying the transfer of power to the rotatable wing and main propeller.

In that form of the invention chosen for purposes of illustration in the drawings the aircraft embodies a fusilage 2 having a wing 4 secured thereto and is provided with a power plant 6 for driving a main propeller 8 which is of the variable pitch type. If desired two separate power plants 6 and main propellers 8 may be used as shown in the drawings. A rotatable wing 10 is mounted for rotation above the fusilage and fixed wings 4 and is rotatable by means of substantially vertical shaft 12 which preferably is located near the center of gravity 14 of the aircraft.

The rotatable wing 10 has autogyro blades 16 and 18 mounted thereon near the opposite ends of the wing and freely rotatable about axes 20 and 22, extending substantially vertically with respect to the rotatable wing but with a slight backward tilt from the direction of motion of the rotatable wing. Upon rotation of the rotatable wing by the power plant 6, the autogyro blades 16 and 18 will be caused to rotate due to the flow of air relative thereto and as a result, these blades will exert a vertical lifting force on the aircraft whenever the rotatable wing 10 is rotated.

In order to compensate for any torque applied to the aircraft due to rotation of the rotatable wing 10, the fusilage is provided with supplemental propeller means such as the propellers 24 and 26 which are spaced from the center of gravity 14 of the aircraft. The supplemental propeller means 24 and 26 are preferably of the variable pitch type and are so mounted and directed as to overcome or compensate for any torque applied to the fusilage due to the rotation of rotatable blade 10. The supplemental propeller means 24 and 26 are preferably driven by the power plant 6 but if desired may be driven by any other suitable source of energy.

The main propeller 8 is preferably mounted on the aircraft near the front thereof and as shown in FIGS. 2 and 3 consist of two separate propellers mounted at opposite sides of the center line of the aircraft. The aircraft further may include various movable airfoil surfaces such as aelerons 28, rudder 30 and the like for aiding in the control and flight of the aircraft.

While the rotatable wing 10 may be actuated by any suitable means, it is preferably driven by the power plant 6 through variable power transmitting means such as those shown diagrammatically in FIGS. 3 and 4. As there shown, two power plants 6 are employed which may be internal combustion engines, each of which has a main drive shaft 32 provided with a gear 34 through which power is transmitted to a shaft 35 having a gear 37 fixed thereto and engaging teeth on the upper face of a ring gear 36 of a planetary gear system. Further as shown in FIG. 4 the supplemental propellers 24 and 26 may be driven from ring gear 36 by means of the gears 39 and 41. Planetary gears 38 and 40 engage teeth on the lower face of the ring gear as well as teeth on the upper face of a differential gear 42. The shaft 12 of the rotatable wing 10 is secured to the differential gear 42 so as to be driven from power plants 6 through ring gear 36 and planetary gears 38 and 40. However, the lower end of shaft 12 is provided with a plate 44 engageable by brake shoes 46 to control the operation of the rotatable wing 10.

The brake 46 is operable to reduce the speed of rotation or to stop rotation of the rotatable wing 10 as desired so that the forces applied to the rotatable wing may be applied, instead, to the main propellers 8 by the main drive shaft 32.

Further the drive system may be provided with holding or positioning means such as a stop member 48 movable into engagement with a plate 50 on the shaft 12 to hold the rotatable wing in a position generally parallel to the fixed wing 4 secured to the fusilage 2. The rotatable wing 10, when thus held, will serve as an airfoil cooperating with the fixed wing for use in horizontal flight of the aircraft. In a similar way braking and positioning means indicated generally at 54 in FIG. 2, may be employed for preventing rotation of the autogyro blades 16 and 18 so as to hold them also in positions generally parallel to the fixed wing 4 whereby the autogyro blades may further function as airfoils during horizontal flight of the aircraft.

In order to facilitate use of the rotatable wing 10 and the rotor blades 16 and 18 as airfoils when they are held stationary and in positions parallel to the fixed wing 4, the rotatable wing and autogyro blades may be formed so as to be symmetrical in cross section transversely thereof as shown in FIG. 5. The autogyro blades may then be turned by suitable means, shown diagrammatically at 56 in FIG. 5, into positions wherein they will provide the most effective airfoil effect, instead of being tilted with respect to their longitudinal axis as they are during their free autogyro rotating action.

In operating the aircraft shown and described, the main propeller 8 may initially be set at zero pitch so that it will not accelerate the air and will impose substantially no load on the power plant. As a result the full power of the power plant 6 is available to be applied through the planetary gearing for rotating the rotatable wing 10. Such rotation of wing 10 will cause the autogyro blades 16 and 18 to rotate in a manner to exert the maximum lifting force to the aircraft. The aircraft then can rise vertically to any desired altitude. During such vertical lift of the aircraft, the supplementary propellers 24 and 26 may initially be positioned so that the blades thereof have zero pitch but as the rotatable blade 10 starts to rotate, a torque will be applied to the aircraft which, if not opposed, would cause the fusilage 2 to rotate in the opposite direction. The supplemental propellers 24 and 26 are then actuated to gradually increase the pitch thereof and apply a counter torque to the aircraft fusilage to balance that produced by the rotation of the wing 10.

When the aircraft has reached the desired elevation the pitch of the main propeller 8 may be gradually increased to move the aircraft forward or backward depending on the direction of pitch increase. This will gradually reduce the proportion of power applied to the rotating wing. When sufficient forward speed has been attained, such that the aircraft obtains much of its lift from its fixed wings and the autogyro rotors provide little lift, the rotating wing is brought to a halt by the application of brake 46 and the simultaneous release of brake 62. The release of brake 62 allows the freewheeling of the shaft 35 and gear 37 so that application of the brake 46 will not impose a load on the engine or affect the rotation of its drive shaft 32.

When the driving of the rotatable wing 10 is discontinued, the wing is brought into a position by judicious application of the brake 62, wherein it is substantially parallel to the fixed wing 4 of the aircraft. Wing 10 is locked in this position by suitable means, such as stop member 48 and lug 50, so that the rotatable wing cooperates with the fixed wing 4 to provide the desired aerodynamic lift of a conventional fixed wing aircraft in horizontal flight. In a like manner, the autogyro blades 16 and 18 may be held and positioned to serve as airfoils.

During horizontal flight, the supplementary propellers 24 and 26 may be brought to zero pitch so as not to accelerate the air and thus to use only minimum power. In the alternative, they may be adjusted in their positions and blade pitch to add their propulsion effect to that of the main propeller 8 if desired. Further, if it is desired to hover or to make any change in altitude, the rotatable wing 10 may be released and driven momentarily or slowly to afford complete flexibility of control of the aircraft at all times during take off, landing, or horizontal or angular flight upward or downward.

The particular type of power transmission and control means shown and described may of course be varied greatly. Separate power plants may be used for driving the main propeller, rotatable wing and supplemental propellers and the manner in which they are controlled and interconnected is capable of many different modifications and design characteristics. In view thereof, it should be understood that the particular embodiment of the invention shown in the drawings and described above is intended to be illustrative only and is not intended to limit the scope of the invention.

We claim:

1. An aircraft configuration comprising:

a fixed wing;

a rotatable wing mounted on said aircraft, above said fixed wing;

freely rotatable autogyro blades mounted on said rotatable wing, adjacent opposite ends of said rotatable wing;

said autogyro blades being operable to exert a lifting force on said aircraft upon rotation of said rotatable wing;

a main propeller for moving said aircraft horizontally;

a power plant, carried by said aircraft, for driving both said rotatable wing and said main propeller; and means for variably transmitting power from said power plant to said rotatable wing and said propeller.

2. An aircraft configuration, according to claim 1, wherein:

the pitch of said main propeller may be controllably varied.

3. An aircraft configuration, according to claim 1, wherein power from said power plant is proportioned between said rotatable wing and said main propeller by variation of the pitch of said main propeller.

4. An aircraft configuration, according to claim 3, wherein:

the pitch of said supplemental propeller means may be controllably varied.

5. An aircraft configuration, according to claim 1, wherein:

supplemental propeller means are mounted on the aircraft at a location spaced from the center of gravity of said aircraft and are operable to counteract torque developed by said rotatable wing.

6. An aircraft configuration, according to claim 5, wherein:

said supplemental propeller means are movable into a position disposed generally parallel to said main propeller to aid in moving the aircraft in a desired horizontal direction.

7. An aircraft configuration, according to claim 1, wherein:
supplemental propeller means are mounted on said aircraft at a location spaced from the center of gravity of said aircraft and operable to drive said aircraft in a desired horizontal direction.

8. An aircraft configuration, according to claim 1, wherein said power transmitting means includes a planetary gear system.

9. An aircraft configuration, according to claim 8, wherein braking means are employed for varying the power transmitted through said planetary gear to said rotatable wing.

10. An aircraft configuration, according to claim 1, wherein said rotatable wing is symmetrical in transverse cross section.

11. An aircraft configuration, according to claim 1, wherein said autogyro blades are symmetrical in cross section.

* * * * *